UNITED STATES PATENT OFFICE.

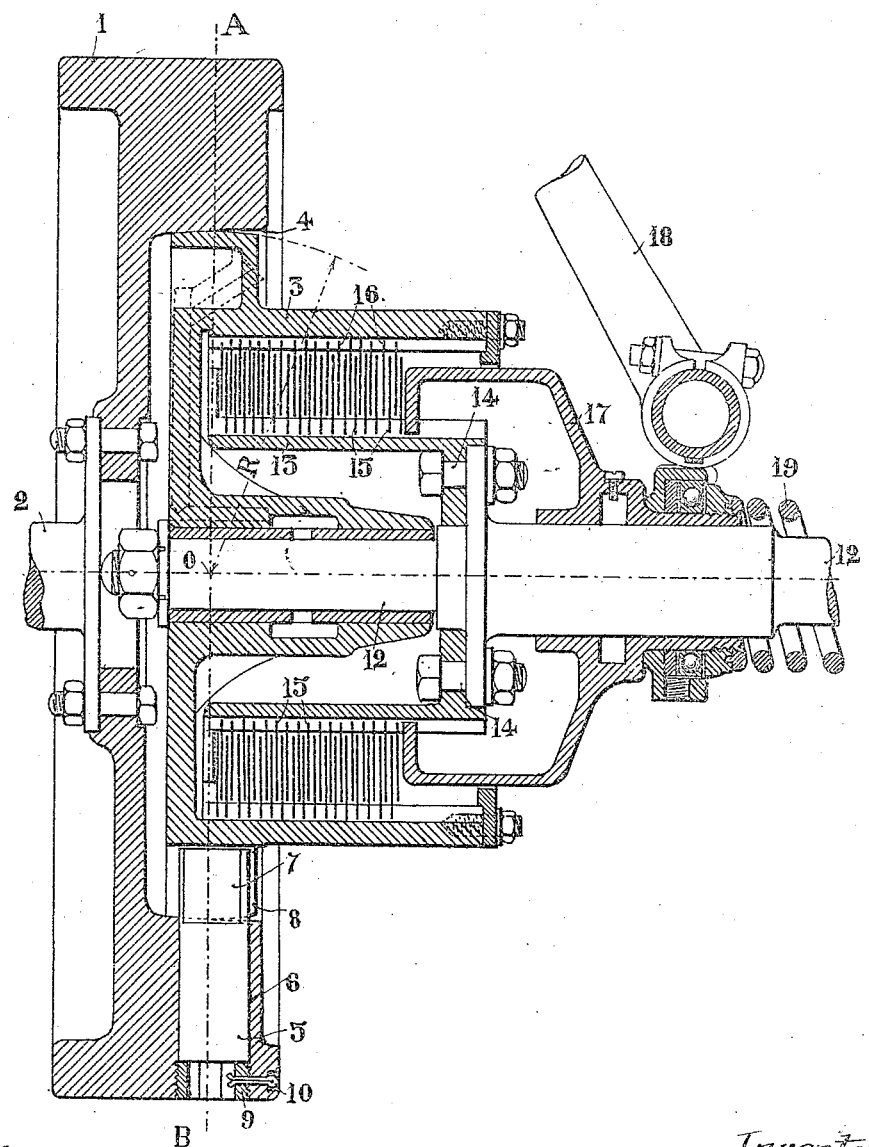

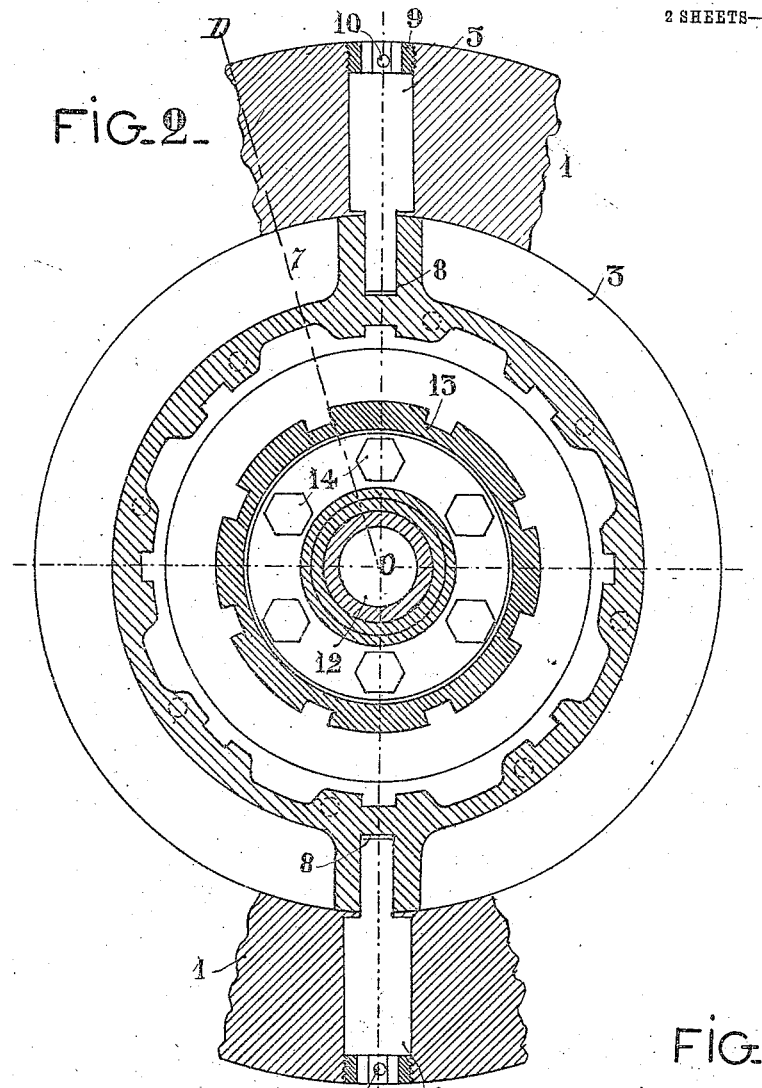
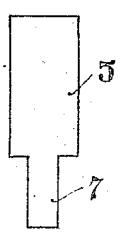
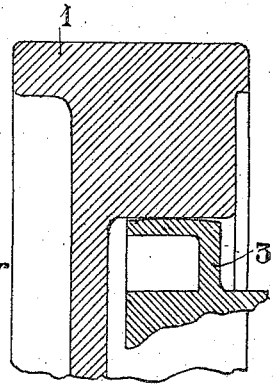

CYSILLE COTTIN, OF LYON-MONPLAISIR, FRANCE.

COUPLING FOR SHAFTS AND THE LIKE.

951,235. Specification of Letters Patent. Patented Mar. 8, 1910.

Application filed December 26, 1908. Serial No. 489,332.

*To all whom it may concern:*

Be it known that I, CYSILLE COTTIN, citizen of France, residing at Lyon-Monplaisir, France, have invented new and useful Improvements in or Relating to Couplings for Shafts and the Like, of which the following is a specification.

This invention relates to a coupling which forms a universal joint between a driving fly wheel and the clutch cup of any clutch, by means of which permanent centering of the clutch cup is obtained in spite of oscillations in any direction, the constant driving being obtained by means of two special tenons held in the driving fly wheel and engaging or sliding in corresponding grooves made in the clutch cup. This method of connection is more particularly applicable to motor vehicles in combination with the cup of a clutch of any desired type.

The accompanying drawing illustrates a construction of the coupling between the fly wheel of an engine and a clutch with multiple disks.

Figure 1 is a longitudinal section on the line C O D of Fig. 2. Fig. 2 is a cross-section on the line A B of Fig. 1. Figs. 3, 4 and 5 are details of a driving tenon. Fig. 6 is a modified construction showing the connection applied to a fly wheel with a cylindrical recess.

According to this invention, the driving fly wheel 1 secured to the main shaft 2, rotates or drives the cup 3 of a clutch which in this case is of the type with multiple disks, but which could also be of any desired type.

The cup 3 engages with the driving fly wheel so as to engage with the interior of the rim of the fly wheel by means of its circumference which has the sectional form of an arc or portion of a sphere of a radius R. The rim of the fly wheel is recessed at the interior, so as to have a sectional form of similar curvature or of the same radius R, the common center O of these spherical portions being situated at a point in the extension of the axis of the main shaft 2. For facilitating the engagement of the cup with the fly wheel, a chambered portion 4 may be provided on the edge where the engagement with the rim takes place.

The driving of the cup 3 by the fly wheel 1 is obtained by means of two tenons 5 of cylindrical shape mounted to fit exactly in holes 6 drilled radially in the thickness of the rim of the fly wheel. Each tenon is continued by a flattened portion 7 for engaging with or fitting into a suitable recess 8 cut longitudinally in the spherical edge of the clutch cup. The tenons 5 are held in position in their recesses by means of a screw plug 9 secured by a pin 10. Owing to this arrangement of the tenons 5, the clutch cup can oscillate about the center O of the centering sphere, and its axis can be inclined upward or downward, to the right or to the left relatively to the axis of the main spindle without any strain being produced thereby or the driving impaired in any way.

Each tenon remains permanently in contact at its flattened portion with the bases of the corresponding groove, and its cylindrical portion engaging with the fly wheel, enables it to turn at an angle in its recess to the necessary extent in accordance with the degree of inclination of the driven spindle relatively to the main shaft. In that way, a means for centering and driving the clutch cup of any clutch is obtained, the elements of said means forming a perfect universal joint.

In the construction shown in the drawing, it will be seen that the driving fly wheel 1 constantly drives the clutch cup 3 which is loose on the secondary or driven spindle 12 by means of the tenons 5. A drum 13 secured to the spindle 12 by means of bolts 14, is arranged in the cup 3 and carries a certain number of friction disks 15 alternately placed with other similar disks 16 supported by the cup 3. A clutch collar 17 controlled by a spring 19, brings the disks into contact and thus produces the coupling. A forked lever 18 enables the spring 19 to be pushed back, in order to throw out the clutch.

The device can be modified in different constructive ways, for instance a fly wheel could be provided with a cylindrical recess for receiving the cup 3, instead of the spherical recess mentioned before. The centering is obtained in the same conditions, and the cup can be easily withdrawn or put in place.

The invention is applicable not only to motor vehicles, but also to any cases of transmission by clutch between two shafts, which while being normally connected in line, must be allowed freely to oscillate relatively to each other.

Having now particularly described and ascertained the nature of my said invention, and in what manner the same is to be performed, I declare that what I claim is:—

1. A coupling comprising a universal joint, a fly wheel, a driving shaft, with the clutch cup mounted on a driven shaft, said universal joint being formed by providing the clutch cup with an edge which is spherical in section and which rests in a cylindro-spherical recess of the fly wheel, opposite radial tenons trunnioned in the rim of the fly wheel and having their flattened ends engaging with corresponding grooves cut longitudinally in the spherical edge of the clutch cup.

2. In combination, a driving shaft, a fly wheel rigidly mounted on said shaft provided with a cylindro-spherical cavity, a driven shaft in axial alinement with said driving shaft, a cup member mounted on said driven shaft and provided with a spherical portion engaging said cylindro-spherical surface and serving to normally hold said driven shaft in axial alinement with said driving shaft and permitting angular movement of said driven shaft with respect to said driving shaft, and means loosely engaging said members with each other for maintaining driving connection therebetween.

3. In combination, a driving shaft, a fly wheel rigidly secured to said shaft and provided with a cylindro-spherical cavity, a driven shaft, a cup loosely mounted on said driven shaft and provided with a spherical portion engaging said cavity and radially disposed tenons rotatably secured to said fly wheel and provided with flattened portions loosely engaging said cup.

In testimony whereof I affix my signature in presence of two witnesses.

CYSILLE COTTIN.

Witnesses:
F. PARETTE,
H. C. COXE.